(12) United States Patent
White (10) Patent No.: US 7,306,465 B2
(45) Date of Patent: Dec. 11, 2007

(54) PHLEBOTOMY TRAINING DEVICE

(76) Inventor: Lorene R. White, 726 Jefferson Pl., Petersburg, VA (US) 23803

( * ) Notice: Subject to any disclaimer, the term of this patent is extended or adjusted under 35 U.S.C. 154(b) by 286 days.

(21) Appl. No.: 11/140,213

(22) Filed: May 27, 2005

(65) Prior Publication Data

US 2006/0269906 A1    Nov. 30, 2006

(51) Int. Cl.
G09B 23/28    (2006.01)
(52) U.S. Cl. ........................................ 434/268
(58) Field of Classification Search ............... 434/262, 434/267, 268, 272
See application file for complete search history.

(56) References Cited

U.S. PATENT DOCUMENTS

| 2,689,415 | A | * | 9/1954 | Haver | 434/272 |
| 2,871,584 | A | * | 2/1959 | Poole | 434/268 |
| 3,226,846 | A |   | 1/1966 | Wood |  |
| 3,789,518 | A |   | 2/1974 | Chase |  |
| 4,182,054 | A | * | 1/1980 | Wise et al. | 434/268 |
| 4,198,766 | A |   | 4/1980 | Camin |  |
| 4,773,865 | A | * | 9/1988 | Baldwin | 434/268 |
| 5,320,537 | A | * | 6/1994 | Watson | 434/272 |
| 5,839,904 | A | * | 11/1998 | Bloom | 434/268 |
| 6,471,518 | B1 | * | 10/2002 | Beattie | 434/272 |

FOREIGN PATENT DOCUMENTS

WO    PCT/US98/20125    6/1999

* cited by examiner

Primary Examiner—Kurt Fernstrom
(74) Attorney, Agent, or Firm—Charles M. Allen; Anthony Tacconi (57) ABSTRACT

A training device to assist medical personnel in learning and practicing phlebotomy and other intravenous penetration techniques. The device is worn like a glove or a sleeve and possesses a network of rubber tubing which simulates a portion of the human circulatory system. The device may contain multiple sections of tubing in order to allow continued use of the device without need for repair or replacement of the tubing after sustained use.

12 Claims, 6 Drawing Sheets

PHLEBOTOMY TRAINING DEVICE

FIELD OF THE INVENTION AND RELATED ART

This invention relates to training aids for medical procedures, more specifically training aids for medical personnel regarding proper phlebotomy and intravenous needle insertion techniques.

Phlebotomy, also known as venepuncture, is the removal of blood for a variety of medical and scientific purposes. Phlebotomy, by its very nature, entails the penetration of a human vein or artery by a hollow needle of some type in order to draw blood. This process is invasive and, when conducted improperly, may lead to infection or physical trauma at the penetration site, or it may simply fail to yield a sufficient quantity of blood. Medical and healthcare personnel, including medical students, nurses, and healthcare technicians, therefore require training in effective and proper techniques of phlebotomy.

In the past, a variety of methods have been used to instruct medical personnel in these techniques. The most simplistic of such is the use of an orange or similar fruit. An orange possesses a fairly thick skin, which is considerably more resilient than the underlying tissue and allows a student to practice controlling the depth of penetration of a needle. The orange, however, is clearly not anatomically similar to a human being.

Thus several types of training aids are disclosed by the prior art in an attempt to create a more advanced, and consequently more realistic, simulation of human anatomy. For example, U.S. Pat No. 5,839,904 (Bloom '904) discloses an intravenous training aid which purports to solve some of these difficulties; however, Bloom '904 suffers from several drawbacks. First, the physical construction is cumbersome, distinctly artificial and fails to properly mimic the appropriate human appendage. Second, the system of tubing that transports the simulated blood is not in a sealed container. The tubing used in this device degrades over time. Consequently, the device is unable to contain a leak that might develop through sustained use of the device. Finally, the device is comprised of only one grouping of tubing. Therefore, when the tubing does succumb to degradation, the user must cease use of the device and replace the tubing.

Many devices exist, including U.S. Pat. No. 3,789,518 Chase (Chase '518), which present simulated human limbs. While the device disclosed in Chase '518 and analogous devices do indeed present realistic training aids for demonstration, they are typically complex and costly. As a result, most educational entities that utilize this type of device possess only a limited number of the devices. This drawback consequently prevents multiple students from simultaneously practicing the relevant techniques. In addition, these devices have limited portability and students are generally not able to take such devices away from the educational forum in order to practice at home or any other location.

SUMMARY AND OBJECTS OF THE INVENTION

The invention discloses a novel and inexpensive training aid that allows a trainee to practice drawing blood from an apparatus that provides a life-like simulation of the pertinent human anatomy. This training aid consists of a glove or sleeve which secures the device to a user; rubber tubing, which simulates human veins or arteries; and a covering which simulates human skin. The device is not mechanically complex and may thus be effectively produced at a lower cost than other similar training aids currently on the market.

It is a central object of the invention to provide a realistic and life-like training-aid for medical personnel to learn proper phlebotomy techniques.

Another purpose of the invention is to provide a cost-effective training device which allows educational entities to utilize multiple units thereby allowing multiple students to train concurrently.

A further purpose of the invention is to provide a training aid that may be used for an extended period without the need for replacement of components.

Another purpose of the invention is to provide a realistic training simulator that minimizes leakage of fluid during use.

A further purpose is to provide a training aid to facilitate instruction concerning the location and palpation of veins and arteries.

Another purpose of the invention is to provide a training simulator that may be easily cleaned, maintained and stored.

Another purpose of the invention is to provide a device that can serve other utilitarian therapeutic functions besides assistance in medical instruction.

DETAILED DESCRIPTION OF THE PREFERRED EMBODIMENT

Figure 1:
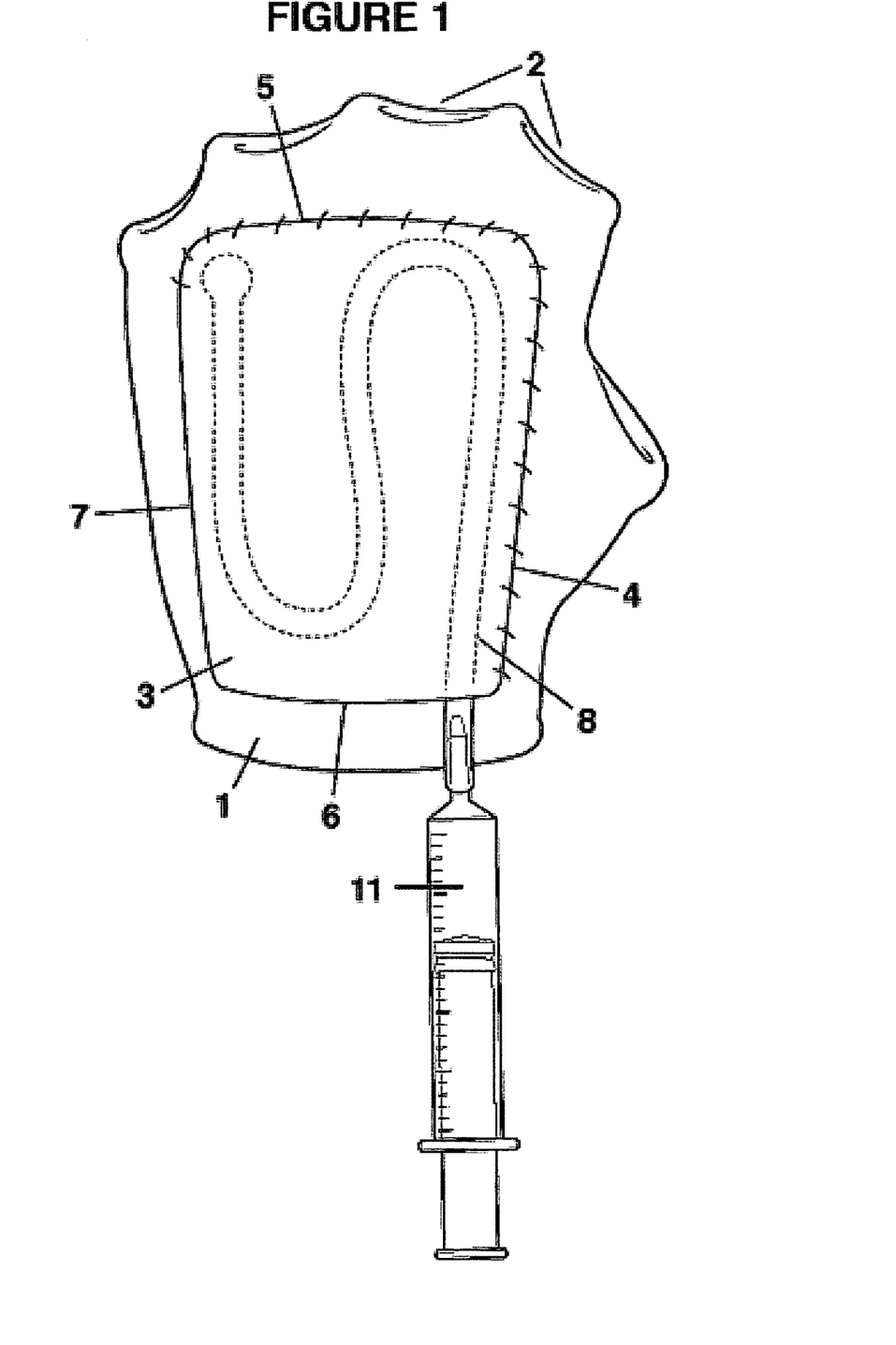
FIG. 1 is a top plan view of the invention.

A training device to assist medical personnel in learning and practicing phlebotomy techniques. Referring now to the drawings, and particularly FIG. 1, it will be observed that the depiction of the primary embodiment of the invention illustrates tubing or a network of tubing affixed to a glove 1. The glove 1 acts as a mounting member in order to allow the device to be borne by a user. The glove 1 can be of a traditional design; however, the preferred embodiment would utilize a truncated glove which encloses only the fingers or wrist of the user. A truncated glove also allows the user to reverse the glove so that it may be comfortably worn on either hand. This permits the user to take advantage of certain features described herein. The glove 1 may be composed of any type of fabric, rubber or other such material of which gloves are commonly constructed. Furthermore, as long as a sufficient portion of the glove is intact to secure the glove onto at least a small portion of the user's fingers, the glove need not have a top and bottom portion, but rather either such portion, in conjunction with at least limited finger apertures 2, will suffice to achieve the purposes of the mounting member.

Indeed, as will be obvious to those skilled in the art, the mounting member need not even be in the form of a glove but can be simply a sleeve or something of such nature and appropriate material so as to permit the temporary affixation of the training device to the hand, arm or other appendage of the wearer during its use.

Figure 2:
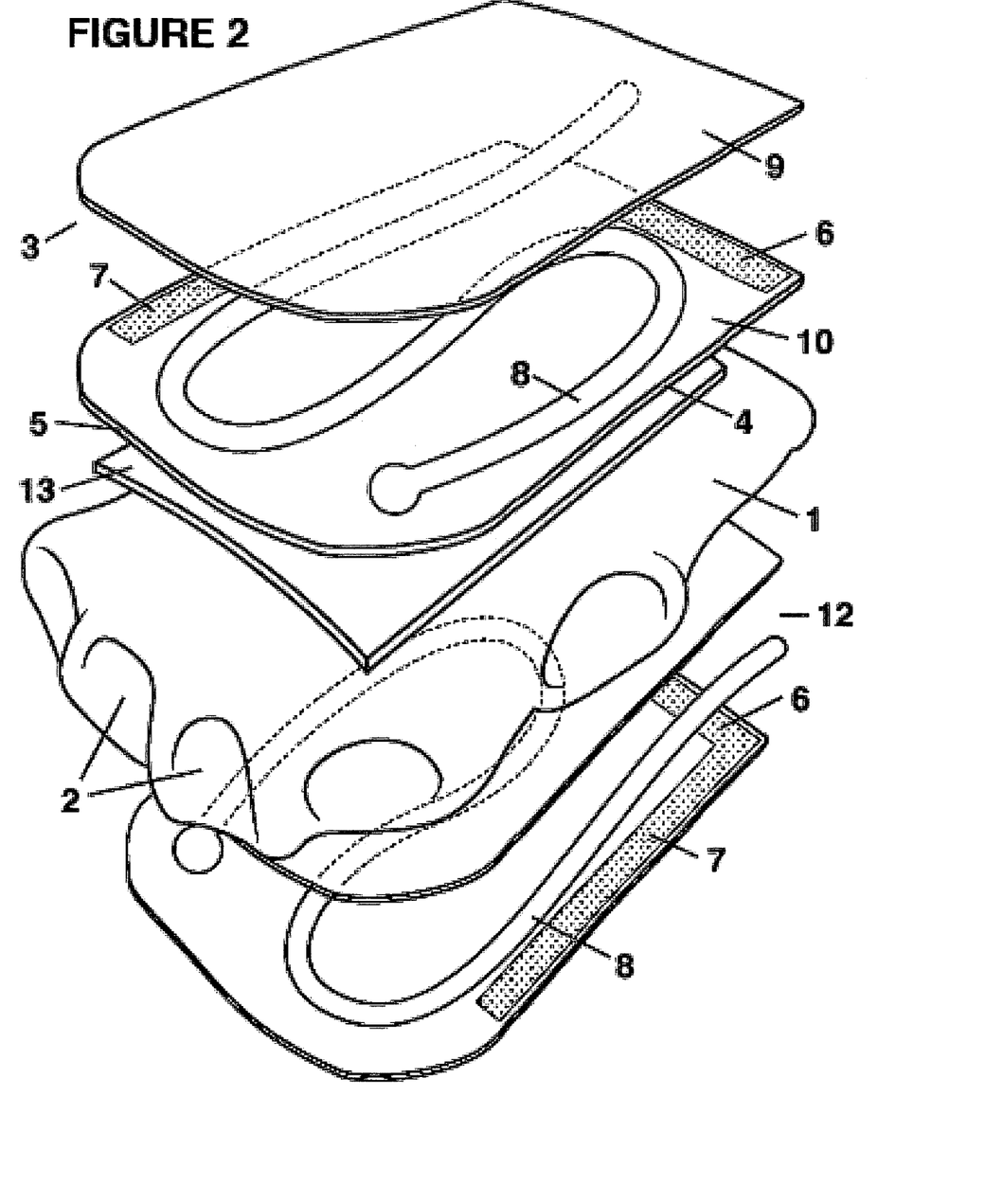
FIG. 2 is an exploded view of the invention.

A vascular simulation element 3 is affixed to at least one side of the glove 1. Referring now to FIG. 2, the vascular simulation element forms a pouch, or internal recess, which contains a top and bottom portion that are sealably connected, either through unitary construction or sealing means, on two sides, 4, the side aligned with the thumb of the wearer, and 5, the side in closest proximity to the fingers of the wearer. The other two sides 6, 7 have a sealing means which may be Velcro®, a zipper, hooks or any such analogous reusable sealing means. This design allows the user to freely access the internal components of the vascular simulation element 3 while limiting any leakage if the components should become damaged or wear over time.

The central feature of the vascular simulation element 3 is a network of penetrable tubing 8 of such diameter, resiliency and elasticity as to simulate human veins or arteries. This tubing must be of such material that it can withstand multiple punctures and will reseal itself following penetration by a hollow-bore needle. The tubing 8 is to be mounted on either the underside of the top portion of the vascular simulation element 9 or the topside of the bottom portion of the vascular simulation element 10. The tubing 8, in both specification and positioning, simulates the veins or arteries in the human body. In the preferred embodiment, the device possesses one section of tubing, of varying length, typically between twenty-two and thirty-two centimeters, that is sealed at one end and in communication with a fluid source 11 at the other end. This tubing is to be arranged in the same manner as veins or arteries would be found in the human hand, arm or other such appendage. Each simulation element may contain one or more lengths of tubing in order to more realistically simulate human anatomy. If more than one length of tubing is used, each individual length of tubing would require a separate source of blood simulating fluid.

The tubing may be secured in a variety of ways, including any type of conventional adhesives or through the use of clips that are immovably secured to the surface of the vascular simulation element 3. Since the tubing 8 is secured directly underneath the top portion of the vascular simulation element 9, i.e., the simulated skin section, it more accurately simulates veins found in a human hand. Therefore, a trainee may use the invention to learn to properly palpate a vein or veins prior to inserting a needle. It will be noted that while clips may be used for mounting purposes, the securing means will preferably be of such fashion or composed of such material so as not to impede the insertion of a needle during use of the device.

The tubing 8 is in sealable communication with a fluid source 11. The fluid source 11 would typically consist of a syringe containing a fluid simulating human blood. In the past, colored fluids such as red Kool Aid® have been used. Generally, a fluid that simulates both the appearance and viscosity of human blood is most desirable. It will be noted that in order to more realistically simulate actual conditions, the user may decrease the amount of fluid in the tubing 8, thereby minimizing the volume of the tubing to simulate dehydration of a patient.

The top of the vascular simulation element, exposed for penetration by needlestick, may be composed of any penetrable material, preferably one that mimics the qualities and feel of human skin. In the preferred embodiment, it will be composed of vinyl, leather or plastic. Such material is often found to possess the appropriate penetrability characteristics while being easy to maintain, clean and disinfect.

A second simulation element 12 may be mounted on the "bottom" of the glove. A second unit is not necessary to the purpose of the invention; however, the second unit allows the user to simply rotate the glove so as to procure a fresh simulation unit. As indicated earlier, after prolonged use, the networking of tubing may require repair or replacement. Unfortunately, the need for such repair and replacement may come at an inconvenient or inopportune time during the course of instruction of medical personnel. If the invention is being used in an embodiment with a second simulation unit, the user may simply turn to the alternate unit if the tubing on the primary unit becomes damaged, thereby allowing the device to be continually used without interruption, and any necessary repairs can be conducted at a later date and time when they can be more conveniently effected. In such a case, only the simulation unit 3 on the top of the user's hand, i.e., the simulation unit in current use, would be connected to a fluid source 11. The tubing for the alternate simulation unit 12 on the underside would be capped, or sealed in such a way as to protect the tubing 8 and prevent the introduction of any foreign agents into the simulated vein network.

A safety shield 13 is situated between the mounting member 1 and the simulation elements 3 and 12. In the preferred embodiment, the safety shield 13 is an impenetrable member consisting of a flat plate. The plate could also possess some degree of curvature so as to more comfortably fit over the user's hand or arm, depending on the specific application. The plate could be composed of metal such as stainless steel or any other such material that is resistant to puncture by a hollow-bore needle as is typically used in phlebotomy. The safety shield 13 could be situated above the glove and below the simulation element currently in use or the member could be inserted into the glove 1 itself so as to be in contact with the topside of the user's hand.

It will also be appreciated that although the vascular simulation elements 3 and 12 have heretofore been described as separate components that are affixed above or below the glove 1, they may be simply incorporated into the glove 1 itself. In such case, the glove 1 and the vascular units 3, 12 would be integrated into one unitary component in the course of manufacturing. In such case, the network of tubing may be affixed to either the underside of the top of the vascular simulation element or the top of the glove worn by the user.

Figure 3:
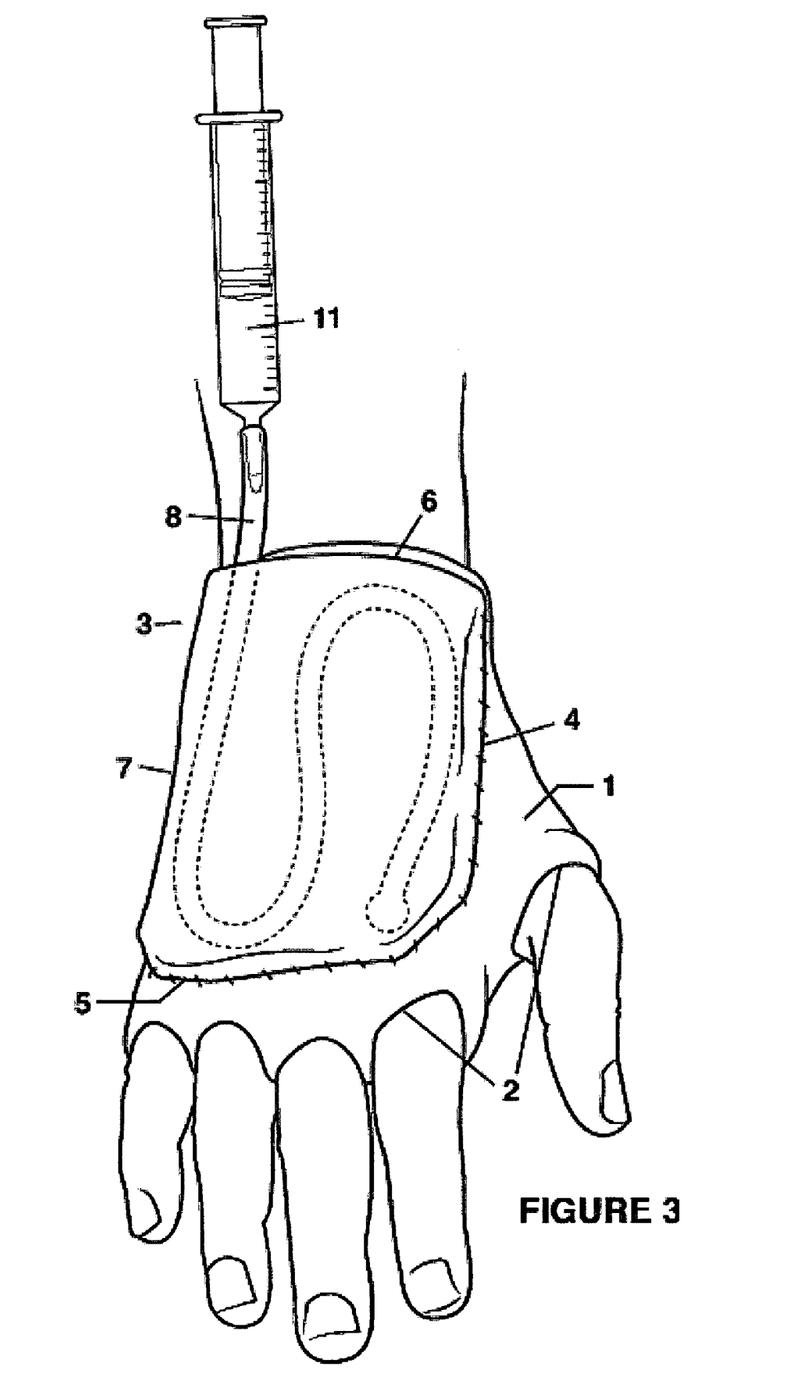
FIG. 3 is an illustration of the invention in use.

A user places the glove 1 on his or her hand with the vascular simulation element 3 positioned so as to be on the top part of the user's hand. If the user is using an embodiment which has a simulation element on both sides of the glove, the user would position the simulation element that he or she wishes to use on the top of the hand. This configuration allows the device to more easily anchor to the wearer's appendage. The user then attaches a syringe 11, containing a blood simulating fluid, to the open aperture in the tubing 8. The user then uses the syringe 11 to fill the tubing 8 with the fluid as can be seen in FIG. 3. At this time, a trainee may safely and realistically practice his or her phlebotomy techniques by palpating and ultimately inserting a needle into the simulated veins and subsequently drawing fluid from these veins.

Figure 4:
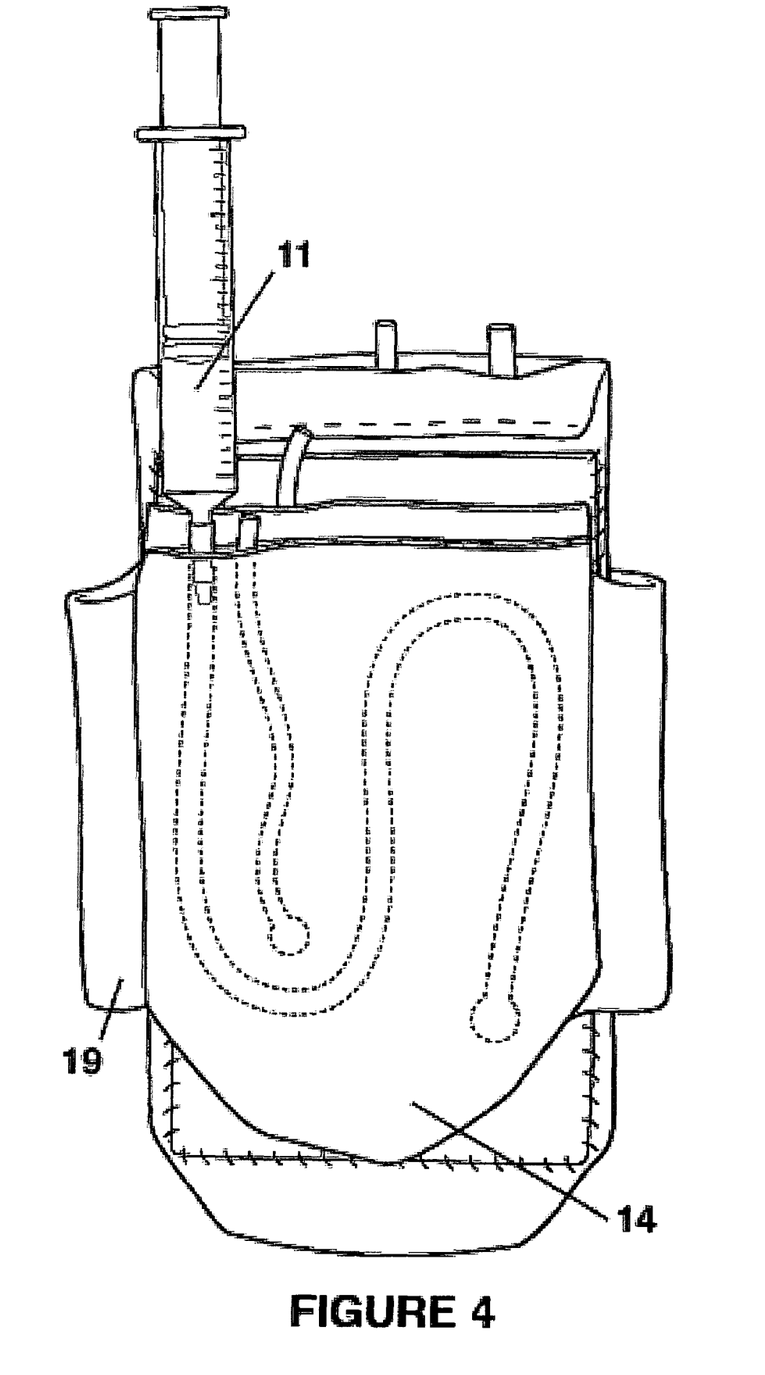
FIG. 4 is a top plan view of an alternate embodiment of the invention.

The invention may also be utilized in an alternate embodiment as depicted in FIG. 4. This alternate embodiment may be used to instruct personnel on the proper phlebotomy technique while drawing blood from a patient's upper arm. This embodiment is designed to accommodate a human arm and be positioned on top of, and to mimic, the antecubital fossa. The alternate embodiment may further be reversible, thus allowing for the incorporation of three vascular simulation elements for increased longevity of use.

This iteration may be secured to a wearer's arm through the use of an elastic, open ended sleeve (not shown). Two vascular simulation units would then be affixed, in opposing positions, to the outside of the sleeve. Just as with the prior embodiment, the user would utilize the upper vascular element 14 until such time that the tubing is compromised from repeated use. The wearer then simply rotates the sleeve and positions the fresh, previously un-used, second vascular simulation element 15 on top.

Figure 5:
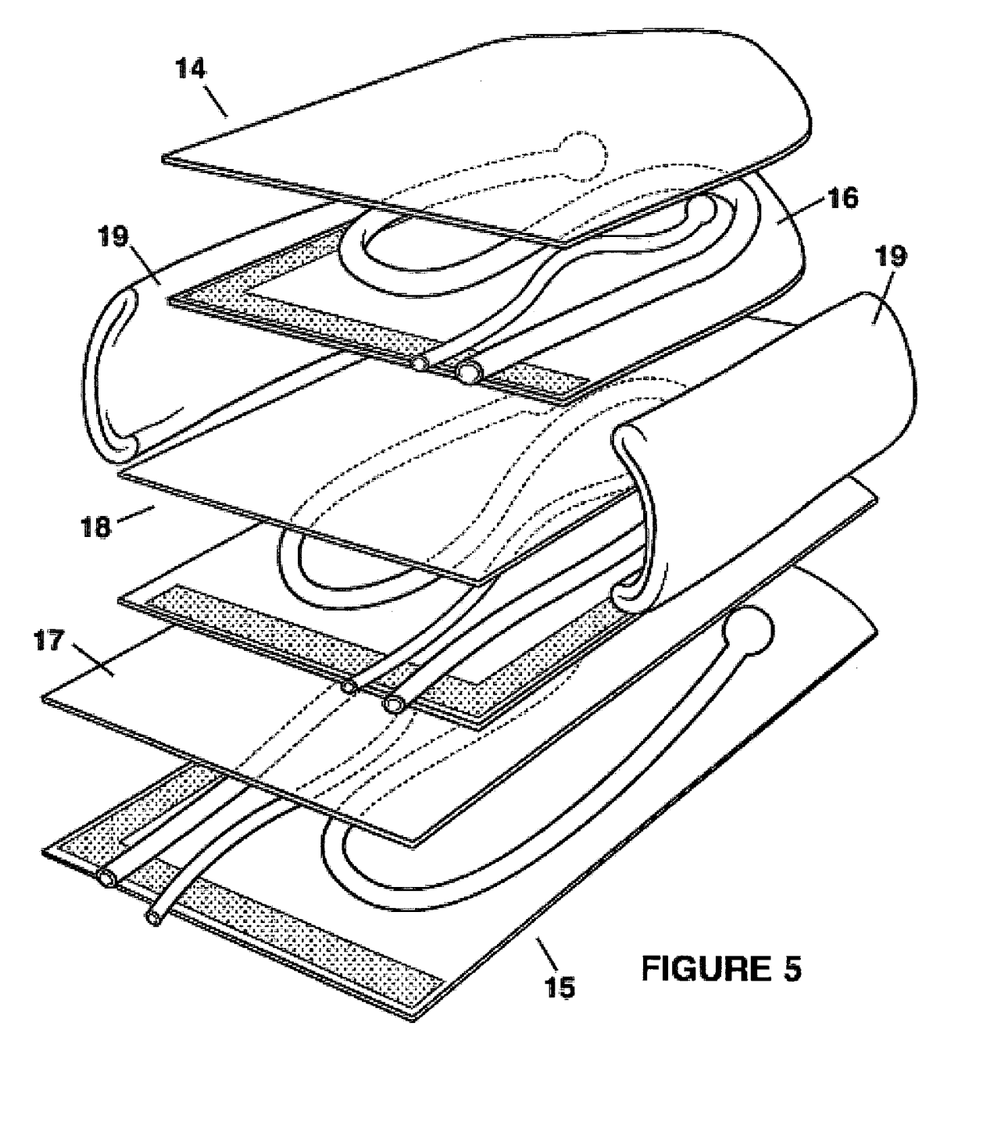
FIG. 5 is an exploded view of an alternate embodiment of the invention.

A third (or even fourth) vascular simulation element may also be added to this embodiment. As can be seen in FIG. 5, a third element may be affixed to the underside of the upper vascular simulation element. In such a configuration, the metallic shield (not shown) would be inserted between the top lower element 16 and the bottom upper element 17 so as to protect the integrity of the wearer's arm as well as the bottom upper element 17 from unwanted perforation.

Figure 6:
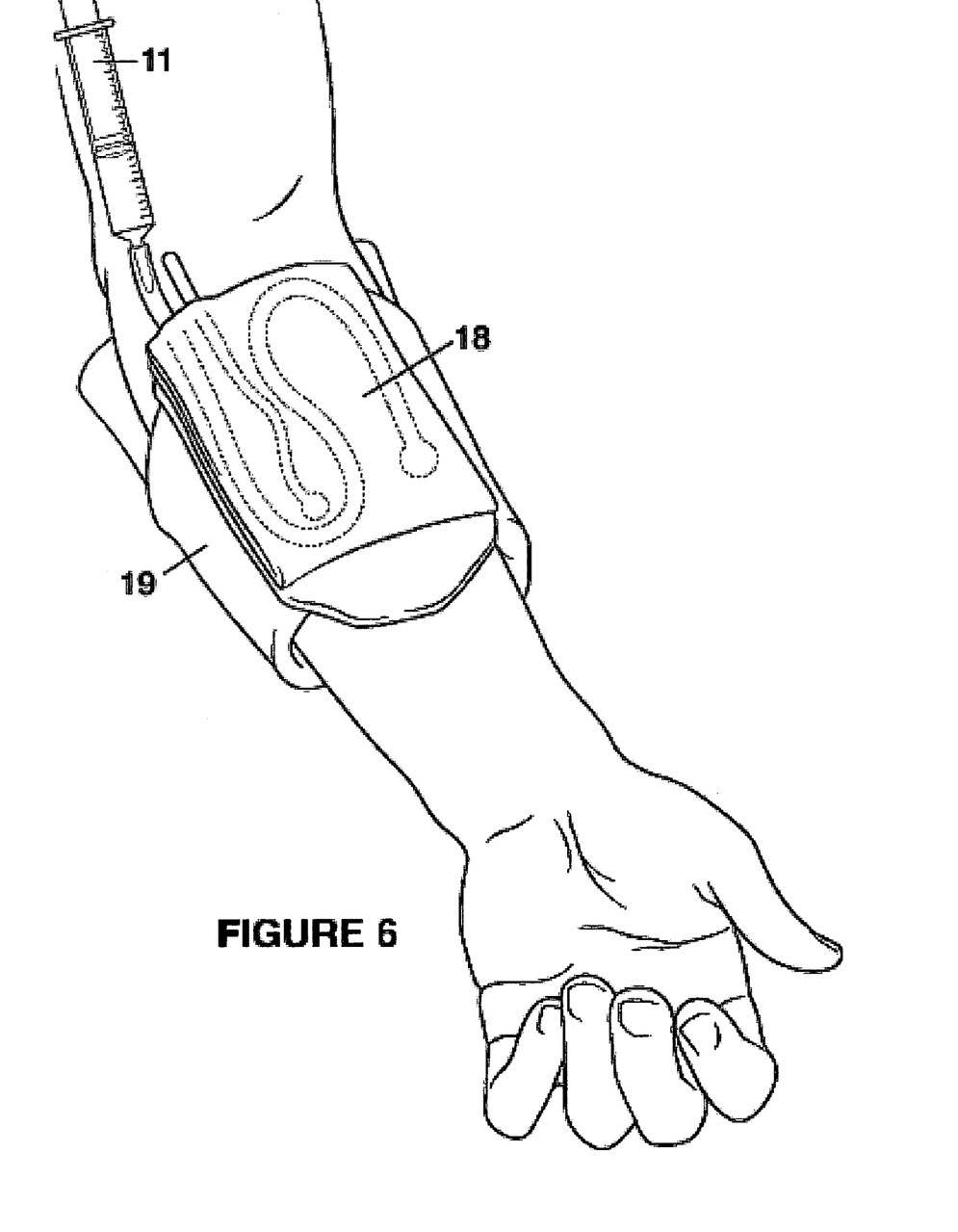
FIG. 6 is an illustration of an alternate embodiment of the invention in use.

In use, following exhaustion of the top upper and bottom elements, the wearer would remove the sleeve, turn it inside out and then re-secure the sleeve to his or her arm, thus exposing the third vascular simulation element 18, as can be seen in FIGS. 5 and 6.

In addition, rather than use of an elastic sleeve, the outer edges of the top and bottom vascular simulation units 14, 15 could be connected by an elastic material 19. In such a configuration, the wearer's upper arm would be in contact with the inside surface 16 of the upper vascular simulation element 14 and the wearer's elbow and the underside of his or her arm would be in contact with the inside surface 17 of the lower vascular simulation element 15.

It will also be recognized that although the embodiments set forth herein all possess tubing that simulates what would be termed as the major veins of the human body in the hand and arm, respectively, the network of tubing could be supplemented or revised so as to incorporate additional tubing of varying diameter. By further adding tubing in conjunction with one or more fluid sources, the devices could be made to simulate both major and minor arteries and veins in each respective location.

It will further be recognized that by alteration of the positioning of the mounting member 1, as well as varying the thickness of the simulated skin and tubing, the device may be used to demonstrate and practice effective techniques involving all types of needle insertions, including insertion of an intravenous port.

The device, in either embodiment, could also be used for other purposes. For instance, the network of tubing could be filled with water, frozen and then applied to a patient's hand or arm, creating a self-secured ice pack. Conversely, the sleeve could be used to secure a heating pad to the arm of a patient. In short, the device may serve additional functions beyond its role as a training aid.

While the invention has been described in reference to certain preferred embodiments, it will be readily apparent to one of ordinary skill in the art that certain modifications or variations may be made to the system without departing from the scope of invention claimed below and described in the foregoing specification.

The invention claimed is:

1. A phlebotomy training device comprising:
   a glove;
   a length of tubing secured to one side of said glove wherein said tubing is sealed at one end;
   a source of fluid in sealable communication with the unsealed end of said length of tubing; and
   a removable penetrable covering on top of said network of tubing.

2. The phlebotomy training device as in claim 1 further comprising a protective sheath interposed between said length of tubing and the hand of a wearer.

3. The phlebotomy training device as in claim 2 wherein said protective sheath is composed of impenetrable material.

4. The phlebotomy training device as in claim 3 wherein said protective sheath is composed of metal.

5. The phlebotomy training device as in claim 1 wherein said glove is a reversible glove that may be worn on either hand of a wearer.

6. The phlebotomy training device as in claims 1, 2, 3, 4, or 5 wherein said source of fluid further comprises a syringe.

7. A medical training device comprising:
   a glove, said glove further comprising a first side and a second side;
   a network of rubber tubing attached to said first side of said glove;
   a second network of rubber tubing attached to said second side of said glove;
   a fluid source in communication with the said first network of tubing when said first network of tubing is anatomically proximal to the dorsal aspect of the hand of the wearer; and
   a fluid source in communication with the said second network of tubing when said second network of tubing is anatomically proximal to the dorsal aspect of the hand of the wearer.

8. A medical training device comprising:
   a first simulation element comprising an upper portion, a lower portion and a network of resealable tubing wherein said network of tubing is affixed between said upper portion and said lower portion;
   a second simulation element comprising a second simulation upper portion, a second simulation lower portion, and a second network of resealable tubing wherein said second network of tubing is affixed between said second simulation element upper portion and said second simulation element lower portion;
   an attachment means connecting said first and second simulation elements and for securing said first and second simulation elements on a wearer; and
   a fluid reservoir in communication with said networks of tubing.

9. The medical training device of claim 8 further comprising a third simulation element comprising:
   a third simulation upper portion, and
   a third network of resealable tubing;
   wherein said third network of tubing is affixed between said third simulation upper portion and said second simulation element lower portion.

10. The medical training device of claim 8 further comprising a protective shield interposed between said simulation unit in use and a wearer of said training device.

11. A phlebotomy training device comprising:
    a glove, having a first and second side;
    a first length of tubing secured to the first side of said glove wherein said tubing is sealed at one end;
    a source of fluid in sealable communication with the unsealed end of said first length of tubing;
    a removable penetrable covering on top of said first network of tubing;
    a protective sheath interposed between said first length of tubing and said hand of a wearer;
    a second network of tubing secured to said second side of said glove wherein said tubing is sealed at one end;

a source of fluid in sealable communication with the unsealed end of said second length of tubing;

a removable penetrable covering on top of said network of tubing, and;

a protective sheath interposed between said second length of tubing and said hand of a wearer.

12. The phlebotomy training device as in claim 11 wherein said glove is a reversible glove that may be worn on either hand of a wearer.

* * * * *